Dec. 1, 1931.  N. COVELL  1,834,237

SAW SET

Filed Nov. 4, 1930  2 Sheets-Sheet 1

INVENTOR
Nathaniel Covell
BY
ATTORNEY

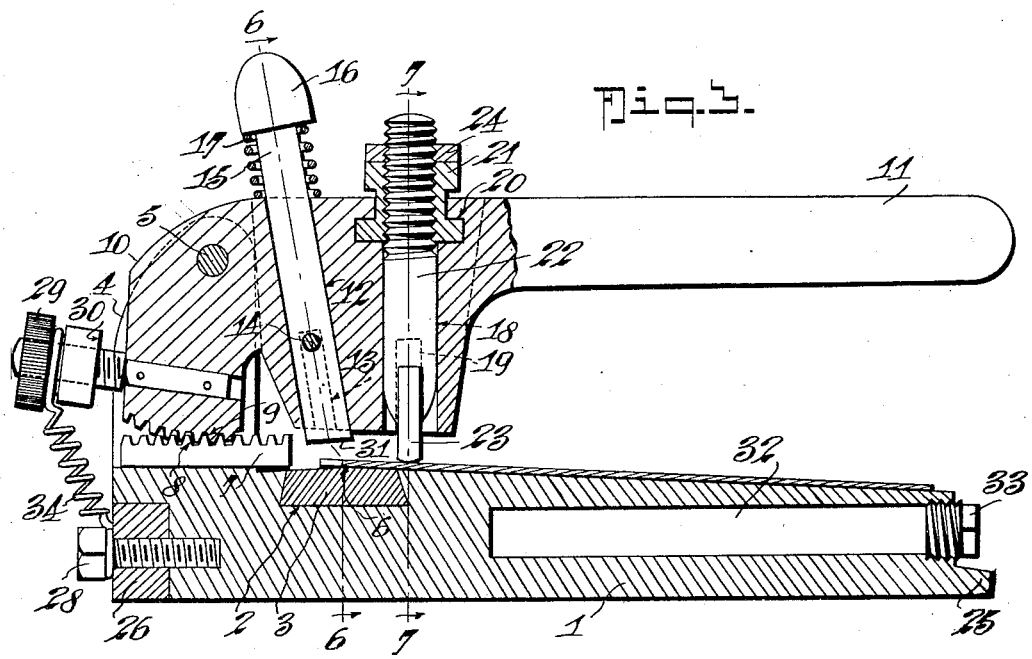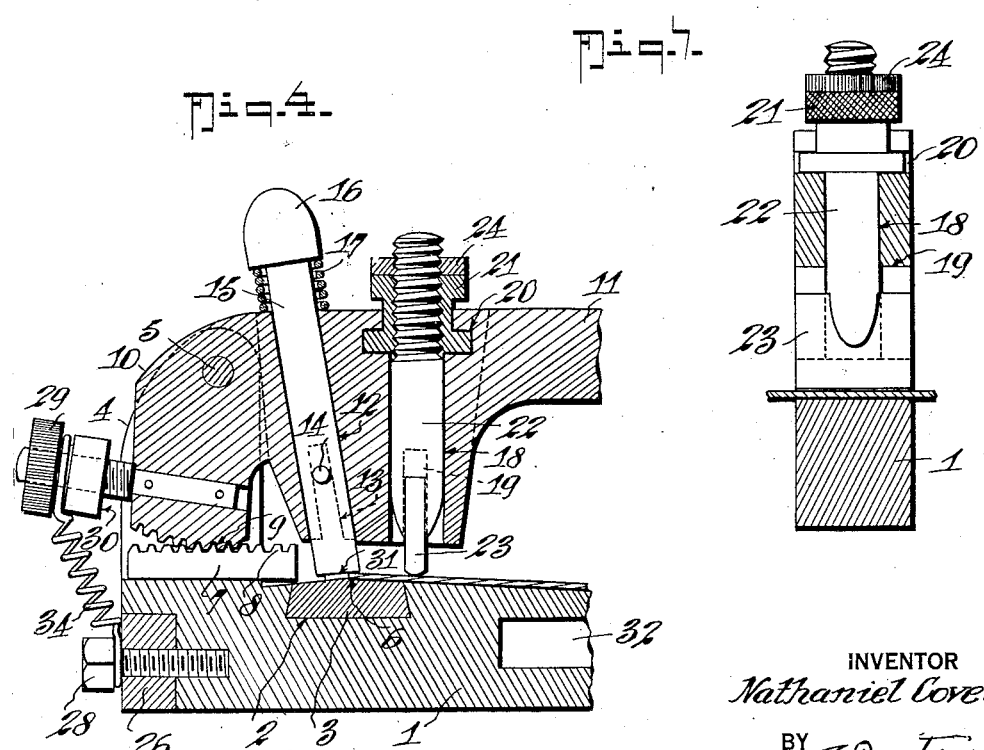

Patented Dec. 1, 1931

1,834,237

UNITED STATES PATENT OFFICE

NATHANIEL COVELL, OF TIDIOUTE, PENNSYLVANIA

SAW SET

Application filed November 4, 1930. Serial No. 493,459.

My invention relates to certain new and useful improvements in devices for imparting the proper set to cross-cut saws, and it has for an object to provide a simple, inexpensive apparatus which may be used with almost any kind and size of cross-cut saws.

Further, the invention has for an object the provision of a base best adapted for a convenient saw set beveled to the angle required for an easy-moving rapid-cutting saw.

A further object is to provide a means for regulating the set (needed for sawing different kinds of wood or other material) to an even gage while the saw is being set, all in one operation and without danger of springing the tooth in the wrong place and without the bother of going over the saw a second time to even the set.

Another object is to provide a support to hold the saw in place firmly on the base so that each tooth will be forged alike even though some of the teeth in the saw may have more temper than others, in order that a smooth, even, clean cutting saw can be obtained without employing skilled workmen to set the saw.

A further object is to provide a saw set which is adapted to a larger number of different sized saws working by the hammer method (which is known to be the best way to set saws).

Further, it is an object of the invention to provide a saw setting apparatus whose plunger pin is adjustable by a thumb screw device to the exact point desired for it to strike the tooth of the saw and it allows for different sizes and thicknesses of saws, also extra dies or attachments to be supplied for certain saws.

Further, it is an object to provide a thumb screw adjustment for regulating the angle to which the teeth are to be set.

Further, the invention has for an object to provide an automatic gage block which, when once set for a particular saw, will automatically recede from the saw teeth as the lever comes down to hold the saw to the base and will again come to its gaging position when the lever is raised to release the saw.

Further, it is an object to provide a saw set the position of whose gage block is adjustable at will.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 5 is an end elevation of the device.

Figure 6 is a cross section on the line 6—6 of Figure 3.

Figure 7 is a cross section on the line 7—7 of Figure 3.

Figure 1:
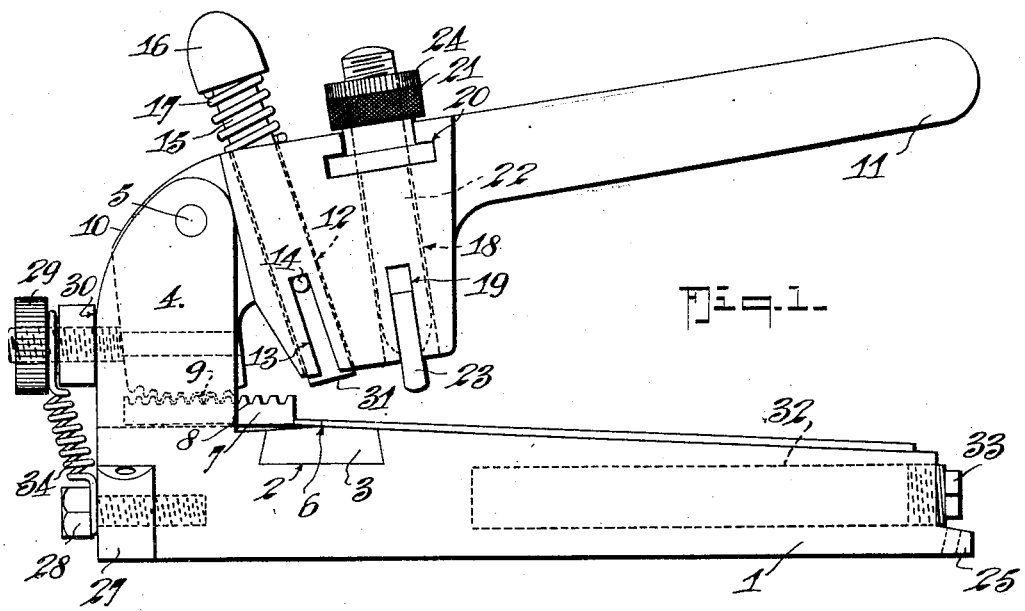
Figure 1 is a side elevation of my device in the open position with a saw blade on the base.
Figure 2:
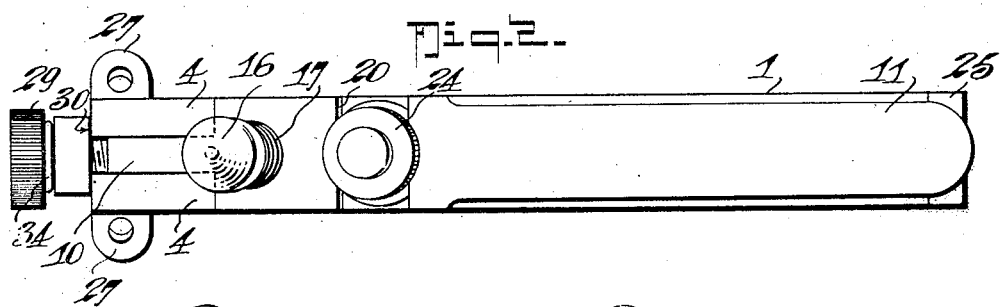
Figure 2 is a top plan view.
Figure 3:
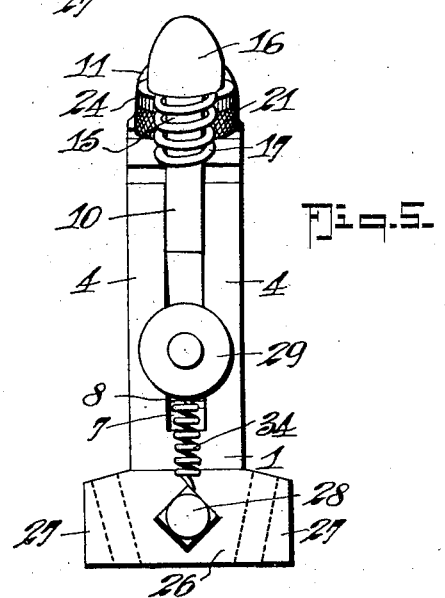
Figure 3 is a vertical longitudinal section of the device with the saw in place and the device in the down position, holding the saw.
Figure 4:
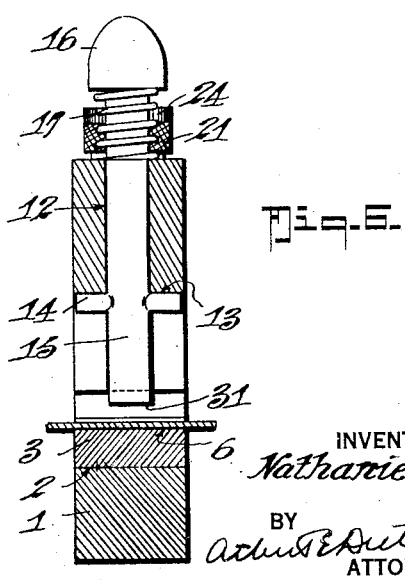
Figure 4 is a detail longitudinal section with the saw in place and the teeth swedged over, the striker pin being shown in its projected position.

In the accompanying drawings in which is illustrated a preferred embodiment of my invention, 1 represents the base on which the saw is to be laid to receive the set, there being provided a recess 2 in the base for the reception of a hardened steel anvil block 3 over which the teeth of the saw are adapted to lie and which cooperates with the striking pin 15 hereinafter again referred to, to give the proper angle or set to the teeth when operated upon. If the entire base is made of hardened material as steel the block 3 may be an integral part of the base, but when the base is made of cast iron, for example, the block 3 is preferably made as a separate element. Another advantage in making the block separate is that blocks with top surfaces differently bevelled may be used interchangeably, thus furnishing a convenient way of increasing or diminishing the angle of the set as may be found best for the particular work the saw is to do.

At one end of the base there is provided a pair of upstanding supports 4 carrying a fulcrum pin 5, and between these supports or uprights 4—4 and longitudinally slidable on the base 1 toward and from the peak 6 of the block 3, is a gage block 7 having a rack portion 8 on its upper face for meshing with the gear segment 9 on the rear portion 10 of the lever 11, which portion lies between the uprights 4—4.

The lever 11 has a body part in which is a bore 12 slidably to receive the striking pin 15 which is held against turning by a pin and slot connection 14—13 as shown, the spring 17 continuously tending to elevate the striking pin and is interposed between the head 16 thereof and the top of the lever. The pin 14, cooperating with the slot 13, also serves to limit the movement of the striking pin under the influence of the spring 17.

The body part of the lever also has a bore 18, at the lower end of which is a cross slot 19, while at the upper end of the bore there is provided an inverted T slot 20 intersecting the bore and adapted to receive a knurled finger operated nut 21 which in turn receives a threaded rod 22 that lies in the bore 18 and carries at its lower end a clamp plate or cross piece 23 which works up and down in a slot 19 to project its lower edge more or less below the bottom of the lever for a purpose presently explained.

The nut 21 is threaded on the rod 22 as is also a jam nut 24 so that having once set the plate 23 to position the jam nut 24 may be used to lock the nut 21 against turning on the threaded rod 22 and thus hold it in its adjusted position.

The base may have a lug 25 at the front and a heel piece 26 at the rear with apertured ears 27 for the reception of securing nails, screws or other suitable devices, the heel piece 26 being preferably held in place by a screw 28 passed through a hole in the heel piece and threaded into a hole in the base.

29 is a thumb screw threaded into the lever member 10 and shouldered at 30 to abut the upright 4 as a stop. A coil spring 34 having its ends passed around the thumb screws 29 and 28, is of sufficient tension continuously tending to hold the lever up with its striking end 31 over the anvil block 3 and with the clamp or holding down plate 23 adjacent the toothed edge of the saw.

After the saw has been laid on the base 1 and slid in under the body part of the lever until the teeth of the saw engage the advance end of the gage black 7, the lever 11 is then pressed down and held firmly with the clamp plate 23 in pressure engagement with the saw to hold it immovable on the base 1 with its teeth overlying the anvil block 3. At this time the striker pin 15 will have its end 31 positioned to lie over the teeth to be set and a blow on the pin head 16 with a hammer or mallet will impart the required swedge or bend to the teeth with which it is brought into contact.

In order to adjust the position of the gage block 7 to allow the teeth to project farther over the hump 6 of the anvil block so that a longer set can be given, it is only necessary to tighten up on the thumb screw 29.

Further, by using the adjustment 21 which effects the position of the plate 23 in the lever and its relative position to the striking pin, the movement of the lever may be so regulated as to obtain an accurate adjustment of the striking pin to the exact point desired for it to strike the teeth of the saw and also allows for saws of different sizes and thicknesses to be set.

The thumb screw 29 regulates the set of the saw teeth and if needed still other adjustments may be had by changing the meshing of the teeth 9 and 8 which is easily done by withdrawing the pin 5, raising the lever to unmesh the teeth and sliding block 7 to the proper position before remeshing the teeth and restoring the pin 5.

If desired, the base may be chambered as at 32 and provided with a closing plug 33 to provide a storage compartment for other size striking pins to be used for setting teeth of different fineness.

While I have shown and described a preferred embodiment of my invention, it is to be understood that changes and modifications in the details of construction, arrangement and design of parts may readily be made without departing from the spirit of the invention or the scope of the appended claims.

What I claim is:

1. A saw set comprising a base, an anvil mounted on the base, a gage block slidably mounted on the base in association with the anvil, a lever fulcrumed on the base, a connection between said lever and said gage block whereby lowering and raising the lever will result in retracting and advancing the gage block, a striker pin carried by the lever in association with the anvil to set the saw teeth, and means carried by the lever for holding down the saw on the base.

2. A saw set comprising a base, an anvil mounted on the base, a gage block slidably mounted on the base in association with the anvil, a lever fulcrumed on the base, a connection between said lever and said gage block whereby lowering and raising the lever will result in retracting and advancing the gage block, a striker pin carried by the lever in association with the anvil to set the saw teeth, means carried by the lever for holding down the saw on the base, and a thumb screw for adjusting the throw of the lever.

3. A saw set comprising a base, an anvil mounted on the base, a gage block slidably mounted on the base in association with the anvil, a lever fulcrumed on the base, a connection between said lever and said gage block whereby lowering and raising the lever will result in retracting and alvancing the gage block, a striker pin carried by the lever in association with the anvil to set the saw teeth, means carried by the lever for holding down the saw on the base, a thumb screw for adjusting the throw of the lever, and a thumb screw for adjusting the saw holding-down means.

4. A saw set comprising a base, an anvil mounted on the base, a gage block slidably mounted on the base in association with the anvil, a lever fulcrumed on the base, a connection between said lever and said gage block whereby lowering and raising the lever will result in retracting and advancing the gage block, a striker pin carried by the lever in association with the anvil to set the saw teeth, and means carried by the lever for holding down the saw on the base, and a thumb screw for adjusting the saw holding-down means.

5. A saw set comprising a base, an anvil removably held on the base, said base having uprights, a hinge pin carried by said uprights, a lever having a portion located between said uprights and fulcrumed on said pin, said portion including a gear segment, a gage block slidably held on said base between said uprights and having gear teeth to mesh with said gear segment, a thumb screw carried by said lever portion and engaging said uprights as a stop, a spring connecting said thumb screw with said base and continuously tending to raise said lever, a swedge pin carried by said lever to cooperate with said anvil, a saw holding-down element mounted on said lever, a screw rod on said element, a thumb nut on said lever and screw rod for adjusting the position of said element substantially as shown and described.

6. A saw set comprising a base, an anvil mounted on the base, a gage block slidably mounted on the base in association with the anvil, a lever fulcrumed on the base, a connection between said lever and said gage block whereby lowering and raising the lever will result in retracting and advancing the gage block, a striker pin carried by the lever in association with the anvil to set the saw teeth, means carried by the lever for holding down the saw on the base, and a thumb screw for adjusting the throw of the lever, said base having a recessed portion in one end, a foot member held in said recessed portion with apertures to receive securing screws, and a screw member passing through said foot member into said body for fastening it in place, and a spring connecting said first mentioned thumb screw with said last mentioned screw for continuously tending to hold said lever elevated.

7. A saw set comprising a base, an anvil mounted on the base, a gage block slidably mounted on the base in association with the anvil, a lever fulcrumed on the base, a connection between said lever and said gage block whereby lowering and raising the lever will result in retracting and advancing the gage block, a striker pin carried by the lever in association with the anvil to set the saw teeth, means carried by the lever for holding down the saw on the base, and means for adjusting the throw of the lever.

8. A saw set comprising a base, an anvil mounted on the base, a gage block slidably mounted on the base in association with the anvil, a lever fulcrumed on the base, a connection between said lever and said gage block whereby lowering and raising the lever will result in retracting and advancing the gage block, a striker pin carried by the lever in association with the anvil to set the saw teeth, means carried by the lever for holding down the saw on the base, and means for adjusting the saw holding-down means with respect to the lever.

NATHANIEL COVELL.